US012183257B2

(12) United States Patent
Feng et al.

(10) Patent No.: US 12,183,257 B2
(45) Date of Patent: Dec. 31, 2024

(54) ELECTRONIC DEVICE AND ITS DRIVING METHOD WITH AN ADJUSTABLE DRIVING VOLTAGE

(71) Applicant: InnoLux Corporation, Miao-Li County (TW)

(72) Inventors: Yu-Hsin Feng, Miao-Li County (TW); Yu-Tse Lu, Miao-Li County (TW); Jen-Chieh Hsieh, Miao-Li County (TW); Yao-Lien Hsieh, Miao-Li County (TW)

(73) Assignee: InnoLux Corporation, Miao-Li County (TW)

(*) Notice: Subject to any disclaimer, the term of this patent is extended or adjusted under 35 U.S.C. 154(b) by 0 days.

(21) Appl. No.: 18/510,598

(22) Filed: Nov. 15, 2023

(65) Prior Publication Data

US 2024/0203317 A1 Jun. 20, 2024

(30) Foreign Application Priority Data

Dec. 20, 2022 (CN) ......................... 202211639917.7

(51) Int. Cl.
*G09G 3/20* (2006.01)

(52) U.S. Cl.
CPC ... *G09G 3/2092* (2013.01); *G09G 2310/0267* (2013.01); *G09G 2310/0289* (2013.01); *G09G 2310/08* (2013.01); *G09G 2330/021* (2013.01); *G09G 2330/12* (2013.01)

(58) Field of Classification Search
CPC .......... G09G 3/20; G09G 3/2092; G09G 3/32; G09G 3/3208; G09G 3/3258; G09G 3/3266; G09G 3/3674; G09G 3/3696; G09G 2310/0289; G09G 2310/08; G09G 2330/021; G09G 2330/12
See application file for complete search history.

(56) References Cited

U.S. PATENT DOCUMENTS

| | | | | |
|---|---|---|---|---|
| 9,767,759 | B2 * | 9/2017 | Shin | G09G 3/3688 |
| 10,665,193 | B2 * | 5/2020 | Li | G09G 3/3677 |
| 2013/0321252 | A1 * | 12/2013 | Hu | G09G 3/3674 345/92 |
| 2018/0218703 | A1 * | 8/2018 | Lee | G09G 3/3648 |
| 2022/0208081 | A1 * | 6/2022 | Kim | G11C 19/28 |

FOREIGN PATENT DOCUMENTS

| | | |
|---|---|---|
| CN | 101408684 B | 8/2010 |

* cited by examiner

*Primary Examiner* — Mihir K Rayan
(74) *Attorney, Agent, or Firm* — Winston Hsu

(57) ABSTRACT

An electronic device includes a display panel, a gate driving circuit and a control unit. The display panel includes a display scan line and a dummy scan line. The gate driving circuit includes a first output unit for providing a display scan signal to the display scan line, and a second output unit for providing a test scan signal to the dummy scan line. The control unit is electrically connected to the gate driving circuit for receiving the test scan signal, updating a driving voltage according to the test scan signal, and driving the gate driving circuit according to the updated driving voltage.

20 Claims, 8 Drawing Sheets

ELECTRONIC DEVICE AND ITS DRIVING METHOD WITH AN ADJUSTABLE DRIVING VOLTAGE

BACKGROUND OF THE DISCLOSURE

1. Field of the Disclosure

The present disclosure is related to an electronic device, and more particularly, to an electronic device and its driving method with an adjustable driving voltage.

2. Description of the Prior Art

With the advancement of display technology, many electronic devices are equipped with displays to increase their operability. However, the displays are power consuming, making them undesirable for mobile devices and portable devices. In addition, the related art applies a fixed driving voltage to drive the display. The driving voltage is not optimized for the hardware of the display, wasting additional power.

SUMMARY OF THE DISCLOSURE

An embodiment provides an electronic device including a display panel, a gate driving circuit and a control unit. The display panel includes a display scan line and a dummy scan line. The gate driving circuit includes a first output unit for providing a display scan signal to the display scan line, and a second output unit for providing a test scan signal to the dummy scan line. The control unit is electrically connected to the gate driving circuit for receiving the test scan signal, updating a driving voltage according to the test scan signal, and driving the gate driving circuit according to the updated driving voltage.

Another embodiment provides a method for driving an electronic device. The electronic device includes a display panel, a gate driving circuit and a control unit. The display panel includes a display scan line and a dummy scan line. The gate driving circuit includes a first output unit and a second output unit. The control unit is electrically connected to the gate driving circuit. The method includes the first output unit providing a display scan signal to the display scan line, the second output unit providing a test scan signal to the dummy scan line, the control unit receiving the test scan signal, the control unit updating a driving voltage according to the test scan signal to generate an updated driving voltage, and the control unit driving the gate driving circuit according to the updated driving voltage.

These and other objectives of the present disclosure will no doubt become obvious to those of ordinary skill in the art after reading the following detailed description of the embodiment that is illustrated in the various figures and drawings.

DETAILED DESCRIPTION

Figure 1:
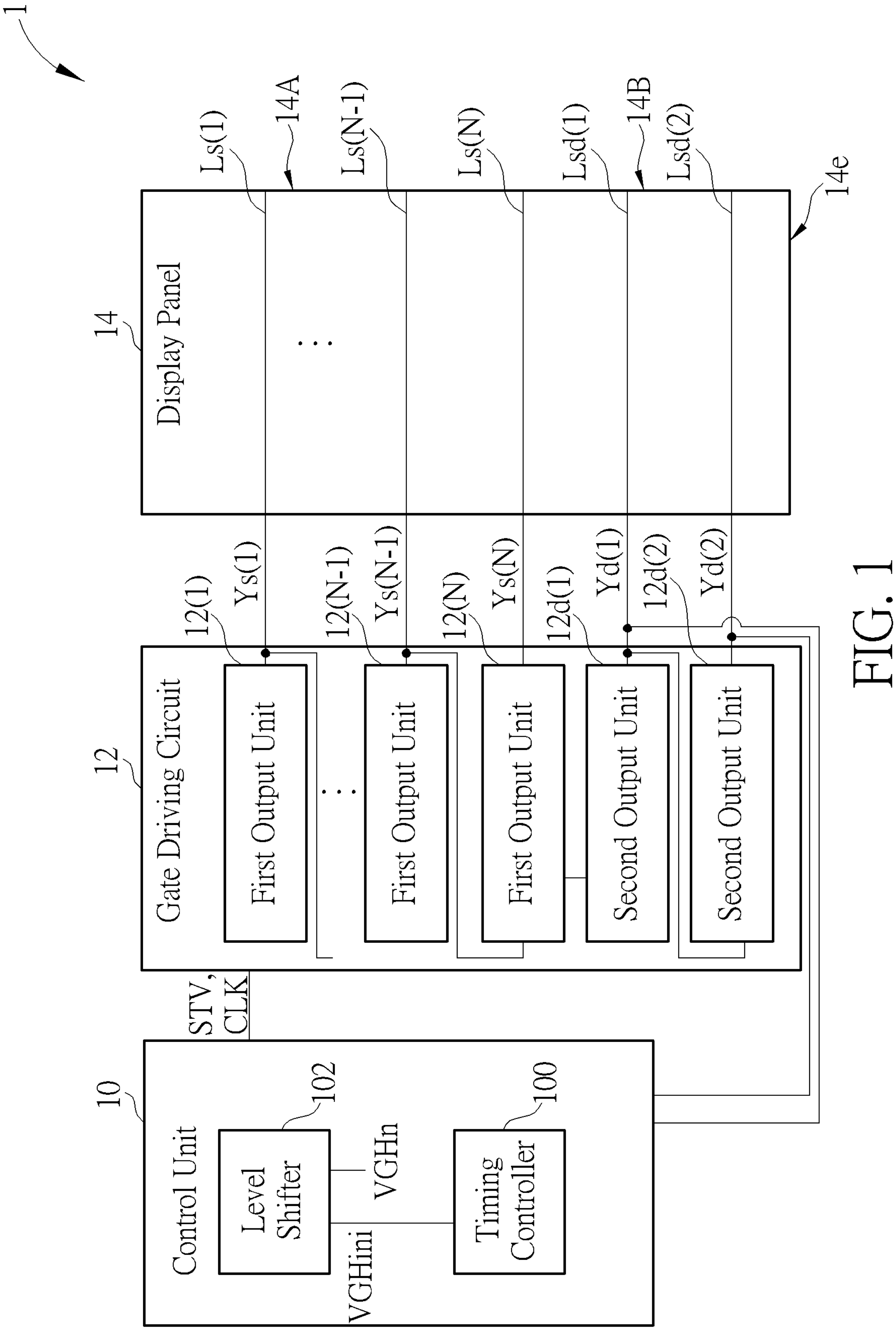
FIG. 1 is a diagram of an electronic device according to an embodiment of the present disclosure.

Certain terms are used throughout the specification and the appended claims of the present disclosure to refer to specific elements. Those skilled in the art should understand that electronic equipment manufacturers may refer to an element by different names, and this document does not intend to distinguish between elements that differ in name but not function. In the following description and claims, the terms "comprise", "include" and "have" are open-ended fashion, so they should be interpreted as "including but not limited to . . . ".

In addition, when one element or layer is "on" or "above" another element or layer, or is connected to another element or layer, it may be understood that the element or layer is directly on the another element or layer, or is directly connected to the another element or layer, and alternatively another element or layer may be between the one element or layer and the another element or layer (indirectly). On the contrary, when the element or layer is "directly on" the another element or layer or is "directly connected to" the another element or layer, there is no intervening element or layer between the element or layer and the another element or layer.

As disclosed herein, the terms "approximately", "about", and "substantially" generally mean within 10%, 5%, 3%, 2%, 1%, or 0.5% of the reported numerical value or range.

The ordinal numbers used in the specification and the appended claims, such as "first", "second", etc., are used to describe the elements of the claims. It does not mean that the element has any previous ordinal numbers, nor does it represent the order of a certain element and another element, or the sequence in a manufacturing method. These ordinal numbers are just used to make a claimed element with a certain name be clearly distinguishable from another claimed element with the same name. Thus, a first element mentioned in the specification may be called a second element.

It should be understood that according to the following embodiments, features of different embodiments may be replaced, recombined or mixed to constitute other embodiments without departing from the spirit of the present disclosure. The features of various embodiments may be mixed arbitrarily and used in different embodiments without departing from the spirit of the present disclosure or conflicting.

In the present disclosure, the electronic device may have a display function and may optionally include an optical sensing, image detecting, touching sensing, or antenna function, other suitable functions or any combination thereof, but not limited thereto. In some embodiments, the electronic device may include tiled device, but not limited thereto. The electronic device may include liquid crystal molecule, light-emitting diode (LED), quantum dots material, a fluorescent material, a phosphor material, other suitable materials, or any combination thereof, but not limited thereto. The LED may for example include organic light-emitting diode (OLED), micro light-emitting diode (micro-LED) or mini light-emitting diode (mini-LED), or quantum dot light-emitting diode (e.g., QLED or QDLED), but not limited thereto. The splicing device may include display splicing device or antenna splicing device, but not limited thereto. It should be understood that the electronic device can be any permutation and combination of the aforementioned, but not limited thereto. In the following, the display device is used as an electronic device or a splicing device to illustrate the content of the disclosure, but the disclosure is not limited thereto.

FIG. 1 is a diagram of an electronic device 1 according to an embodiment of the present disclosure. The electronic device 1 can be a monitor, a television, a tablet computer, a smart phone or other display devices. The electronic device 1 can be driven by an updated driving voltage VGHn to operate, and can scan the voltage range of the updated driving voltage VGHn to determine the lowest driving voltage for the electronic device 1, so as to optimize the driving voltage, reduce power consumption and prolong service life.

The electronic device 1 may include a control unit 10, a gate driving circuit 12 and a display panel 14. The control unit 10 and the gate driving circuit 12 are electrically connected. The gate driving circuit 12 and the display panel 14 are electrically connected. In some embodiments, the gate driving circuit 12 can be integrated on the substrate of the display panel 14 (also called gate on panel (GOP)), and can be formed on a single side of the display panel 10. GOP can reduce the number of pins of the display driver chip. According to some embodiments, the gate driving circuit 12 can be formed outside the display panel 14.

As shown in FIG. 1, the control unit 10 may include a timing controller 100 and a level shifter 102 coupled to each other. The timing controller 100 can output an initial driving voltage VGHini having a predetermined level to the level shifter 102, for example, the initial driving voltage VGHini can be 30V. The level shifter 102 can adjust the initial driving voltage VGHini to generate an updated driving voltage VGHn, and output a start signal STV and a clock signal CLK to the gate driving circuit 12 according to the updated driving voltage VGHn, to drive the gate driving circuit 12, the updated driving voltage VGHn may be lower than the initial driving voltage VGHini, for example, the updated driving voltage VGHn may be 22V. For example, the start signal STV may include a plurality of start pulses with a fixed period, and each start pulse may trigger the scanning of an image frame, and the high level of each start pulse may be equal to the high gate voltage. For example, the initial driving voltage or the updated driving voltage VGHn, the low level of the start signal STV may be equal to the gate low voltage, and the low gate voltage may be 0V. The clock signal CLK may include a plurality of clock pulses with a fixed period, and the high level of each clock pulse may be equal to the high gate voltage, such as the initial driving voltage or the updated driving voltage VGHn, the low level of the pulse wave of each clock pulse can be equal to the low gate voltage.

As shown in FIG. 1, the gate driving circuit 12 includes first output units 12(1) to 12(N) and second output units 12*d*(1) and 12*d*(2) connected in sequence, where N is a positive integer greater than 1, such as N=1080. Although not shown in detail in FIG. 1, according to some embodiments, the plurality of first output units may be connected in a sequential manner, that is, the first output unit 12(1) may be connected to the first output unit 12(2), the first output unit 12(N−1) may be connected to the first output unit 12(N). An output unit 12(N−1) may be connected to the first output unit 12(N). Or, according to some embodiments, the plurality of first output units each may be connected to every second preceding and/or subsequent first output unit, that is, the first output unit 12(1) may be connected to the first output unit 12(3), and the first output unit 12(N−2) may be connected to the first output unit 12(N). Or, according to some embodiments, the plurality of first output units each may be connected to every third preceding and/or subsequent first output unit, that is, the first output unit 12(1) may be connected to the first output unit 12(4), and the first output unit 12(N−3) may be connected to the first output unit 12(N). Or, according to some embodiments, the plurality of first output units each may be connected to every fourth preceding and/or subsequent first output unit, that is, the first output unit 12(1) may be connected to the first output unit 12(5), and the first output unit 12(N−4) may be connected to the first output unit 12(N). Or, according to some embodiments, the plurality of first output units each may be connected to every (Z−1)th preceding and/or subsequent first output unit, that is, the first output unit 12(1) may be connected to the first output unit 12(Z), and the first output unit 12(N−Z+1) may be connected to the first output unit 12(N). Z is a positive integer smaller than N. The present invention has no certain limitation on the connection method between the multiple first output units, the above connection methods are only examples and do not limit the present invention.

As shown in FIG. 1, the display panel 14 includes at least one display scan line and at least one dummy scan line, for example, a plurality of display scan lines Ls(1) to Ls(N) and a plurality of dummy scan lines Lsd(1) and Lsd (2). Each display scan line Ls(1) to Ls(N) can be coupled to M display pixels for displaying images, and M is a positive integer greater than 1, for example, M=1920. The dummy scan lines Lsd(1) and Lsd(2) may not be electrically connected to the display pixels. The first output units 12(1) to 12(N) provide display scan signals Ys(1) to Ys(N) to display scan lines Ls(1) to Ls(N) respectively. The second output units 12*d*(1) and 12*d*(2) provide test scan signals Yd(1) and Yd(2) to the dummy scan lines Lsd(1) and Lsd(2) respectively. The control unit 10 is electrically connected to the gate driving circuit 12 for receiving test scan signals Yd(1) and Yd(2). The control unit 10 can update the driving voltage according to the test scan signal Yd(1) and/or Yd(2). The control unit 10 can drive the gate driving circuit 12 according to the updated driving voltage VGHn.

As shown in FIG. 1, the sequential connection method of the first output units is illustrated as an example below; the present invention is not limited thereto. The first output units 12(1) to 12(N) can receive the clock signal CLK, and the first output unit 12(1) can be triggered by the start signal STV to generate the display scan signal Ys(1) according to the first clock pulse of the clock signal CLK. The first output unit 12(2) can be triggered by the display scan signal Ys(1) to generate the display scan signal Ys(2) according to the next clock pulse of the clock signal CLK, and the first output unit 12(N) can be triggered by the display scan signal Ys(N−1) to generate the display scan signal Ys(N) according to the Nth clock pulse of the clock signal CLK. Therefore, the first output units 12(1) to 12(N) can sequentially generate the display scan signals Ys(1) to Ys(N) according to the clock pulse of the clock signal CLK, and can respectively provide the display scan signal Ys(1) to Ys(N) to the display scan lines Ls(1) to Ls(N) to drive the display pixels on the display scan lines Ls(1) to Ls(N). Each pulse of the display scan signals Ys(1) to Ys(N) may have a first output voltage. If the display scan signals Ys(1) to Ys(N) are all normal, each first output voltage can be equal, for example equal to the updated driving voltage VGHn.

As shown in FIG. 1, the second output units 12d(1) and 12d(2) can receive the clock signal CLK. The second output unit 12d(1) receives the signal of the first output unit 12(N). For example, the second output unit 12d(1) can be triggered by the display scan signal of the first output unit 12(N) to generate the test scan signal Yd(1) according to the Nth clock pulse of the clock signal CLK, and the second The output unit 12d(2) can be triggered by the test scan signal Yd(1) to generate the test scan signal Yd(2) according to the (N+1)th clock pulse of the clock signal CLK.

According to some embodiments, after at least some of the first output units output the display scan signal, the second output units output the test scan signal. For example, as shown in FIG. 1, after all the first output units 12(1), 12(2) . . . 12(N) output the display scan signals, the second output unit 12d(1) outputs the test scan signal Yd(1). Then the second output unit 12d(2) outputs the test scan signal Yd(2). Therefore, the time for the second output units 12d(1) and 12d(2) to output the test scan signal can be predetermined. That is, if the second output unit 12d(1) outputs the test scan signal under normal conditions, the control unit 10 may receive the test scan signal at a predetermined time. If the second output unit 12d(1) receives the test scan signal at a non-predetermined time, the control unit 10 may determine the test scan signal is abnormal.

The second output unit 12d(1) and 12d(2) can generate the test scan signals Yd(1) and Yd(2) sequentially according to the clock pulses of the clock signal CLK, and can provide the test scan signals Yd(1) and Yd(2) to the dummy scan lines Lsd(1) and Lsd(2) respectively to return the test scan signals Yd(1) and Yd(2) to the control unit 10 to optimize the updated driving voltage VGHn. Each pulse of the test scan signals Yd(1) and Yd(2) may have a second output voltage.

If the test scan signals Yd(1) and Yd(2) are normal, the control unit 10 can receive the test scan signals Yd(1) and Yd(2) at a predetermined time, and the second output voltages of the test scan signals Yd(1) and Yd(2) both can be greater than the predetermined voltage Vdet. For example, the predetermined voltage Vdet can be equal to 22V. If the second output voltage of the test scan signal Yd(1) is 30V, the control unit 10 can determine that the test scan signal Yd(1) is normal. If the control unit 10 receives the test scan signal Yd(1) and/or Yd(2) at a non-predetermined time, or the second output voltage of the test scan signal Yd(1) and/or Yd(2) is lower than the predetermined voltage Vdet, the control unit 10 can determine that the test scan signal Yd(1) and/or Yd(2) is abnormal. According to some embodiments, the predetermined voltage Vdet may be equal to 22V. If the second output voltage of the test scan signal Yd(1) is 12V(less than the predetermined voltage Vdet), the test scan signal Yd(1) is abnormal.

In some embodiments, if the second output voltages of the test scan signals Yd(1) and Yd(2) are both equal to the predetermined voltage Vdet, and the control unit 10 receives the test scan signals Yd(1) and Yd(2) at a predetermined time point, the control unit 10 can determine that the test scan signals Yd(1) and Yd(2) are both normal. In other embodiments, if the second output voltage of the test scan signal Yd(1) and/or Yd(2) is equal to the predetermined voltage Vdet, and/or the control unit 10 does not receive the test scan signal Yd(1) and/or Yd(2) at the predetermined time point, the control unit 10 can determine that the test scan signal Yd(1) and/or Yd(2) is abnormal.

According to some embodiments, the control unit 10 stores a predetermined voltage Vdet. If the second output voltage of the test scan signal Yd(1) is lower than the predetermined voltage Vdet, the control unit 10 can increase the driving voltage to generate an updated driving voltage VGHn. If the second output voltage of the test scan signal Yd(1) is greater than the predetermined voltage Vdet, the control unit 10 may decrease the driving voltage to generate an updated driving voltage VGHn. If the updated driving voltage VGHn is not too low, the highest pulse voltage of each test scan signal Yd(1) and Yd(2) should be greater than the predetermined voltage Vdet. If the updated driving voltage VGHn is too low, the highest pulse voltage of the test scan signal Yd(1) or Yd(2) will be lower than the predetermined voltage Vdet.

Within a predetermined period of time after starting up, the electronic device 1 can be tested in the test mode. The test mode may include a non-display mode and/or a display mode, which is not limited in the present invention. According to some embodiments, as shown in FIG. 1, the display panel 14 has a display area 14A and an adjacent surrounding area 14B. The display scan line Ls(1) can be formed in the display area 14A, and the dummy scan line Lsd(1) can be formed in the surrounding area 14B. According to some embodiments, the dummy scan lines are formed in the surrounding area 14B of the display panel 14, such as the non-display area 14B, so the dummy scan signals will not affect the image displayed in the display area 14A. According to some embodiments, the display area 14A may be formed in a middle area of the display panel 14, the surrounding area 14B may be formed in an edge area of the display panel, and the surrounding area 14B may surround the display area 14A. The surrounding area 14B may be formed closer to the edge 14e of the display panel 14 than the display area 14A. The display area 14A may be an area for displaying images, and the surrounding area 14B may be an area for not displaying images, that is, a non-display area.

According to some embodiments, although not shown in the figure, at least one dummy scan line Lsd(1) may be formed in the display area 14A, and may be formed between two display scan lines Ls. Moreover, at least one second output unit 12d can be formed between two first output units 12. In detail, for example, the dummy scan line Lsd(1) may be formed between the plurality of display scan lines Ls(1) to Ls(N), for example, the dummy scan line Lsd(1) may be disposed between the display scan lines Ls(M) and Ls(M+1), where M is an integer, and $M<N$. In this case, the second output unit 12d(1) outputs the test scan signal Yd(1) after the first output units 12(1), 12(2) . . . 12(M) output the display scan signals. Then, the first output unit 12 (M+1) outputs a display scan signal. Therefore, the time when the second output unit 12d(1) outputs the test scan signal can be predetermined. That is, if the second output unit 12d(1) outputs the test scan signal under normal conditions, the control unit 10 may receive the test scan signal at a predetermined time.

According to some embodiments, although not shown in the figure, the dummy scan line Lsd(1) may be formed in the display area 14A, and the dummy scan line Lsd(2) may be formed in the non-display area 14B. According to some embodiments, although not shown in the figure, the dummy scan line Lsd(1) may be formed between the display scan lines Ls(M) and Ls(M+1), and the dummy scan line Lsd(2) may be formed between the display scan lines Ls(P) and Ls(P+1), where M and P are integers, $M<P<N$.

In the test mode, the control unit 10 can receive test scan signals Yd(1) and Yd(2), and the level shifter 102 of the control unit 10 can update the driving voltage VGHini/VGHn according to the test scan signals Yd(1) and Yd(2) to generate an updated driving voltage VGHn, and drive the gate driving circuit 12 according to the updated driving voltage VGHn. In some embodiments, if the test scan signals Yd(1) and Yd(2) are normal, the level shifter 102 can decrease the driving voltage VGHini/VGHn by a predetermined voltage difference, if the test scan signals Yd(1) and/or Yd(2) is abnormal, the level shifter 102 can increase the driving voltage VGHini/VGHn by a predetermined voltage difference until the test scan signals Yd(1) and Yd(2) return to normal.

Figure 6:
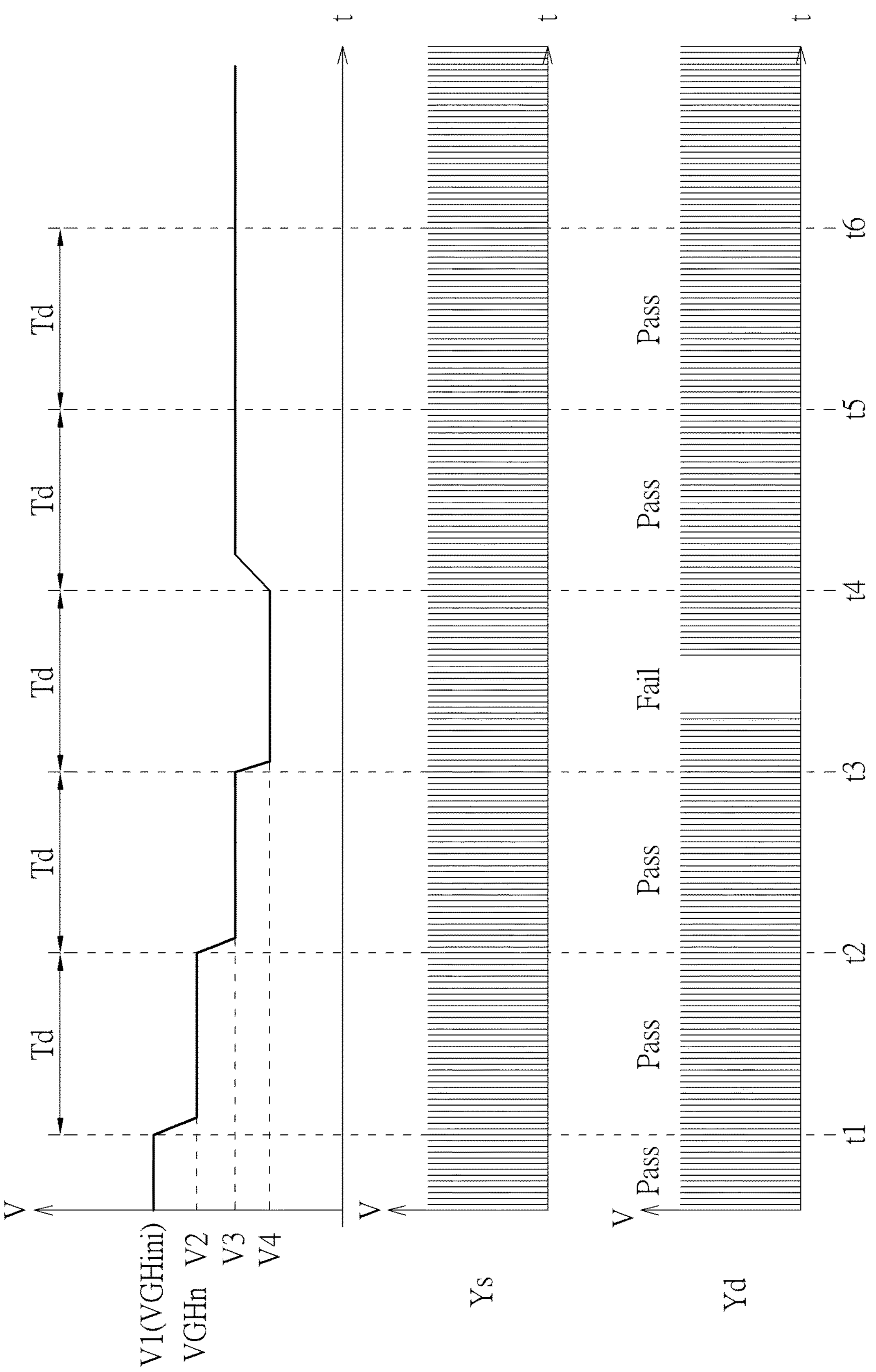
FIG. 6 is a diagram of the driving method in FIG. 5.

For example, the predetermined voltage difference may be 1V. During standby, the electronic device 1 can operate in the standby mode and the specific mode, and the control unit 10 can receive the test scan signals Yd(1) and Yd(2) at fixed or non-fixed time intervals, to determine whether the updated driving voltage VGHn is too low or not. According to some embodiments, as shown in FIG. 6, the control unit 10 may receive the test scan signal at a fixed time interval Td. In some embodiments, if the test scan signal Yd(1) and/or Yd(2) is abnormal, the control unit 10 determines that the driving voltage VGHini/VGHn is too low, and the level shifter 102 can increase the driving voltage VGHini/VGHn by a predetermined voltage difference until the test scan signals Yd(1) and Yd(2) return to normal. The level shifter 102 can update the driving voltage VGHini/VGHn according to the test scan signals Yd(1) and Yd(2) to find the lowest driving voltage VGHn for the electronic device 1 to work normally, to reduce power consumption and prolong the service life.

In some embodiments, the electronic device 1 can receive the driving voltage optimization command. Once the driving voltage optimization command is received, the control unit 10 can obtain the test scan signals Yd(1) and Yd(2), and the level shifter 102 can update the driving voltage VGHini/VGHn according to the test scan signals Yd(1) and Yd(2), and drive the gate driving circuit 12 according to the updated driving voltage VGHn.

Figure 2A:
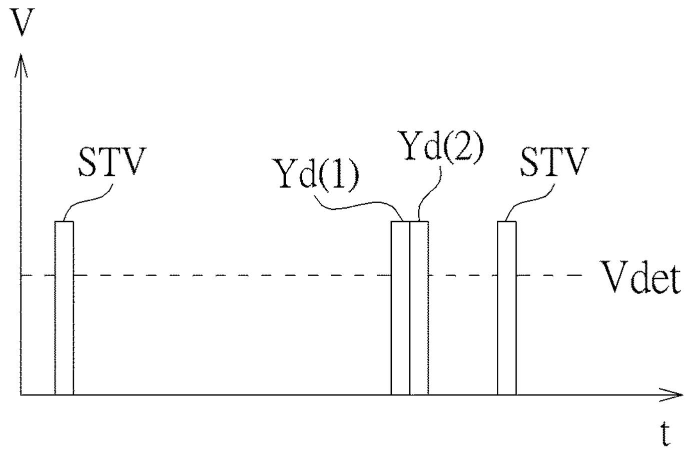
FIG. 2A shows a diagram of normal test scan signals.
Figure 2B:
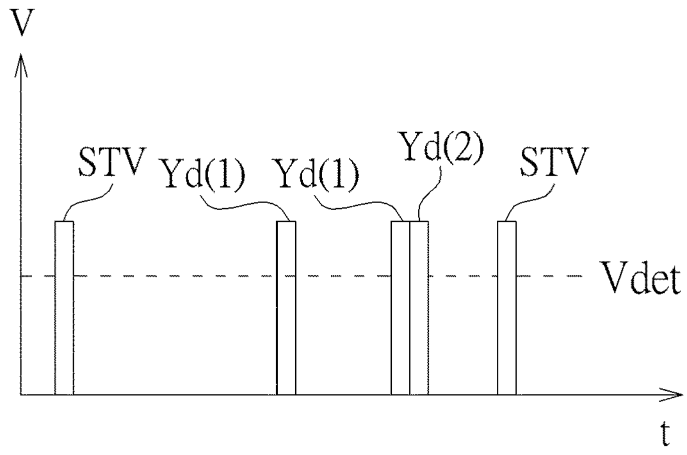
FIG. 2B is a diagram showing an abnormal test scan signal.
Figure 2C:
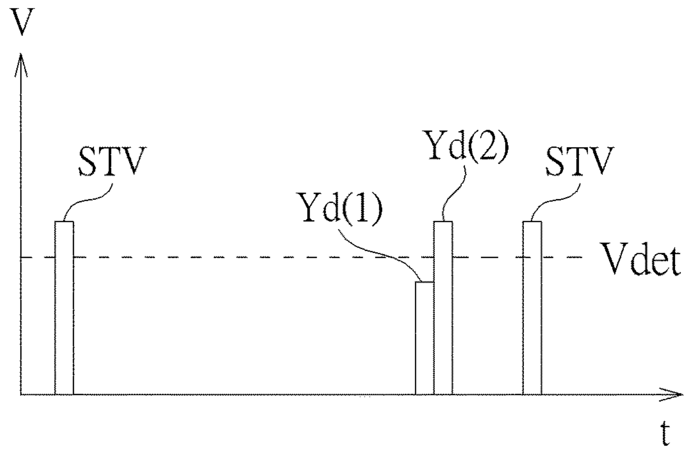
FIG. 2C is a diagram diagrams showing an abnormal test scan signal.

FIG. 2A shows a diagram of normal test scan signals Yd(1) and Yd(2), indicating that the driving voltages VGHini/VGHn are normal and not too low. FIGS. 2B and 2C are diagrams showing the abnormal test scan signal Yd(1), indicating that the driving voltage VGHini/VGHn is too low. The horizontal axis is time, and the vertical axis is voltage in FIGS. 2A, 2B and 2C. According to some embodiments, the control unit 10 can be used to store a predetermined voltage Vdet. According to some embodiments, if the control unit 10 receives the test scan signals Yd(1) and Yd(2) at a predetermined time and the second output voltages of the test scan signals Yd(1) and Yd(2) are both greater than the predetermined voltage Vdet, as shown in FIG. 2A, indicating that the driving voltage is normal and not too low. At this time, the control unit 10 can decrease the driving voltage to generate an updated driving voltage VGHn. According to some embodiments, if the control unit 10 receives the test scan signal Yd(1) or Yd(2) at a non-predetermined time, as shown in FIG. 2B, two first test scan signals Yd(1) being received after the start signal STV is sent out indicates that the driving voltage is too low, and the control unit 10 can increase the driving voltage to generate an updated driving voltage VGHn. According to some embodiments, if the control unit 10 receives the test scan signals Yd(1) and Yd(2) at a predetermined time, but the second output voltage of the test scan signal Yd(1) is less than the predetermined voltage Vdet, as shown in FIG. 2C, then the driving voltage is too low, and the control unit 10 can increase the driving voltage to generate an updated driving voltage VGHn.

As mentioned in the preceding paragraphs, after receiving the start signal STV, the gate driving circuit 12 will sequentially generate display scan signals Ys(1) to Ys(N) and test scan signals Yd(1) and Yd(2). Therefore, during normal operation, as shown in FIG. 2A, the control unit 10 will receive the test scan signals Yd(1) and Yd(2) sequentially at predetermined time after the start signal STV is sent out, and then send out the next start signal STV to trigger the scanning of the next image frame, the second output voltage of the test scan signal Yd(1) and the second output voltage of the test scan signal Yd(2). According to some embodiments, the predetermined voltage Vdet may be 22V. The second output voltage of the test scan signal Yd(1) and the second output voltage of Yd(2) may be equal to or greater than 22V. For example, as shown in FIG. 2A, the second output voltage of the test scan signal Yd(1) received at a predetermined time is 30V, and the second output voltage of the test scan signal Yd(2) received at another predetermined time is also 30V, and the second output voltage of the test scan signals Yd(1) and Yd(2) are both greater than the predetermined voltage Vdet(30V>22V), so the control unit 10 determines the test scan signal Yd(1) and Yd(2) are both normal.

During abnormal operation, as shown in FIG. 2B, the control unit 10 receives the test scan signal Yd(1) at a non-predetermined time, and receives the test scan signals Yd(1) and Yd(2) at a predetermined time, then sends the next start signal STV to trigger the scan of the next image frame. The second output voltage of the test scan signal Yd(1) and the second output voltage of Yd(2) can be greater than or equal to the predetermined voltage Vdet (for example 22V). The additional test scan signal Yd(1) may be triggered by a pre-matured pulse in one of the display scan signals Ys(1) to Ys(N) owing to abnormality. Since the test scan signal Yd(1) is received at an unexpected time, even if the test scan signals Yd(1) and Yd(2) are received at the predetermined time and the test scan signals Yd(1) and Yd(2) are both greater than the predetermined voltage Vdet, the control unit 10 still determines the test scan signal Yd(1) is abnormal.

In another abnormal operation, as shown in FIG. 2C, the control unit 10 receives the test scan signals Yd(1) and Yd(2) at a predetermined time, and then sends the next start signal STV to trigger the next image frame scan. The control unit 10 can compare the second output voltage of the test scan signal Yd(1) with the predetermined voltage Vdet. Since the second output voltage of the test scan signal Yd(1) is smaller than the predetermined voltage Vdet and the second output voltage of the test scan signal Yd(2) is greater than the predetermined voltage Vdet, the control unit 10 determines that the test scan signal Yd(1) is abnormal and the test scan signal Yd(2) is normal. For example, the second output voltage of the test scan signal Yd(1) may be 12V, and the predetermined voltage Vdet may be 22V. Since the second output voltage of the test scan signal Yd(1) is lower than the predetermined voltage Vth (12V<22V), the control unit 10 determines that the test scan signal Yd(1) is abnormal. The second output voltage of the test scan signal Yd(2) can be 30V, and the predetermined voltage Vdet can be 22V. Since the second output voltage of the test scan signal Yd(2) is greater than the predetermined voltage Vth (30V>22V), the control unit 10 determines that the test scan signal Yd(2) is normal.

The embodiment of the present disclosure is not limited to the abnormal operations shown in FIGS. 2B and 2C, the control unit 10 can detect other abnormal operations of the test scan signals Yd(1) and Yd(2). For example, the test scan signal Yd(1) is normal and the abnormality of the test scan signal Yd(2) can also be regarded as the abnormality of the test scan signal.

According to some embodiments, the test scan signal is regarded as normal if the output voltage of the test scan signal is greater than the predetermined voltage Vdet, and the test scan signal appears at a predetermined time, as shown in FIG. 2A. According to some embodiments, the test scan signal is regarded as abnormal if the test scan signal occurs at an unexpected time, as shown in FIG. 2B. According to some embodiments, the test scan signal is regarded abnormal if the output voltage of the test scan signal is less than the predetermined voltage Vdet, as shown in FIG. 2C.

Although FIGS. 1, 2A, 2B and 2C only show two second output units 12*d*(1) and 12*d*(2), the present disclosure is not limited thereto, and those skilled in the art can set other numbers of second output units according to actual needs, and the second output unit can be formed behind any one of the first output units 12(1) to 12(N), so as to speed up the detection time of the test scan signal. In addition, although FIG. 1 only shows one clock signal CLK, the present disclosure is not limited thereto, and those skilled in the art can set other numbers of clock signals according to actual needs. Moreover, although FIG. 1 only shows one gate driving circuit 12 formed on the left side of the display panel 14, the present disclosure is not limited thereto, and those skilled in the art can arrange other numbers of gate driving circuits 12 according to actual needs. For example, when the display panel 14 is larger, a first gate driving circuit and a second gate driving circuit can be respectively provided on the left side and the right side of the display panel 14 to enhance the driving capability.

Figure 3:
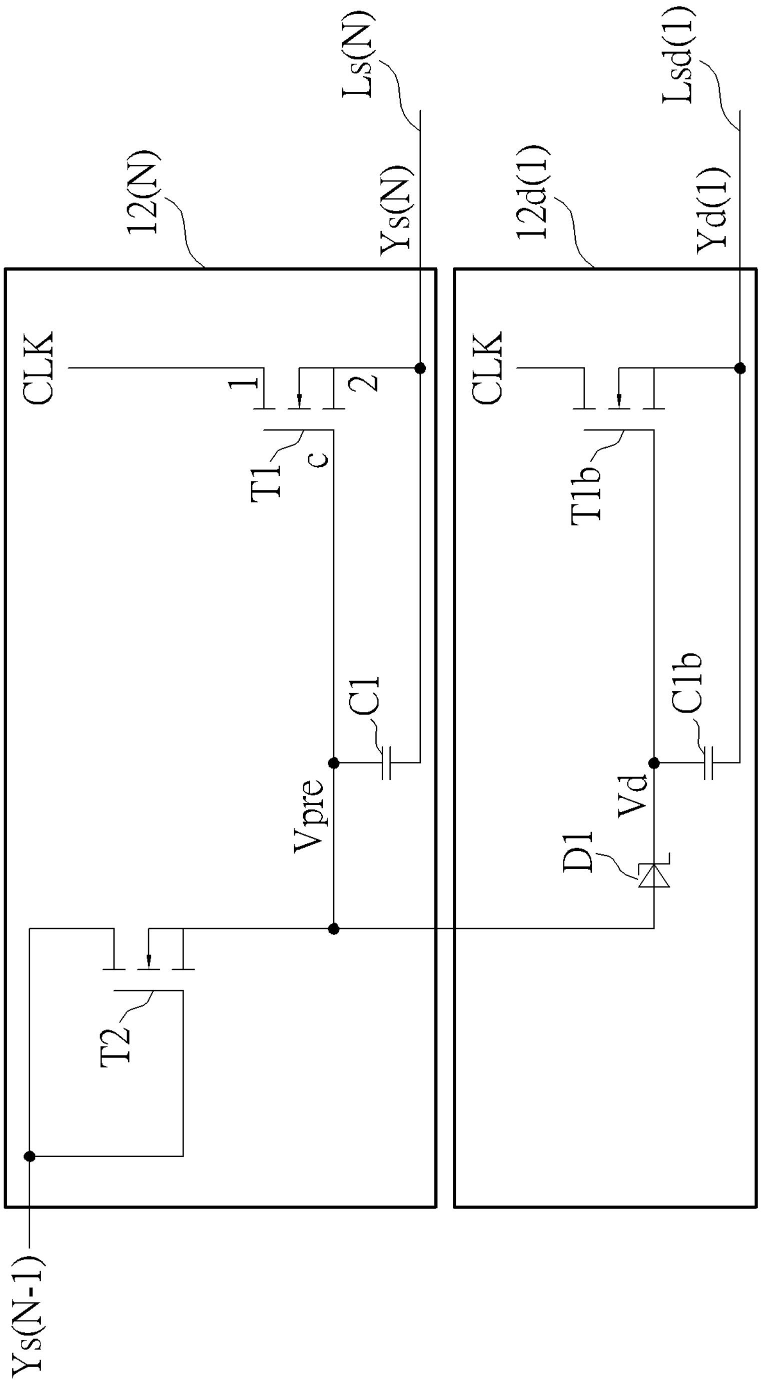
FIG. 3 is a schematic diagram of a partial circuit of the gate driving circuit of the electronic device in FIG. 1.

FIG. 3 is a schematic diagram of a partial circuit of the gate driving circuit 12. FIG. 3 shows the first output unit 12(N) and the second output unit 12*d*(1).

The first output unit 12(N) may include a precharge transistor T2, a first capacitor C1 and a first driving transistor T1. The precharge transistor T2 may include a control end, a first end coupled to the control end of the precharge transistor T2 for receiving the pulse of the display scan signal Ys(N−1), and a second end for outputting the precharge Voltage Vpre. The first capacitor C1 includes a first end coupled to the second end of the precharge transistor T2, and a second end. The first driving transistor T1 includes a control end c coupled to the first end of the first capacitor C1, a first end 1 for receiving a clock signal CLK generated according to the driving voltage VGHini/VGHn, and a second end 2 coupled to the second end of the first capacitor C1 for outputting the display scan signal Ys(N). The second output unit 12*d*(1) may include a voltage drop unit D1, a second capacitor C1*b*, and a second driving transistor T1*b*. The voltage drop unit D1 includes a first end coupled to the second end of the precharge transistor T2, and a second end for outputting a voltage drop Vd. The second capacitor C1*b* includes a first end coupled to the second end of the voltage drop unit D1, and a second end. The second driving transistor T1*b* includes a control end coupled to the first end of the second capacitor C1*b*, a first end for receiving the clock signal CLK, and a second end coupled to the second end of the second capacitor C1*b* for outputting the test scan signal Yd(1). In FIG. 3, the precharge transistor T2, the first driving transistor T1 and the second driving transistor T1*b* may be N-type metal-oxide-semiconductor field-effect transistors (MOSFETs), and the transistor size of the first driving transistor T1 and the second driving transistor T1*b* can be the same. According to other embodiments, the precharge transistor T2, the first driving transistor T1 and the second driving transistor T1*b* may be other types of transistors, such as P-type transistors, the present invention is not limited thereto.

In the first output unit 12(N), the precharge transistor T2 can be set in the form of a diode, and can make the display scan signal Ys(N−1) reduce the voltage drop of the threshold voltage Vthn to generate the precharge voltage Vpre (=Ys(N−1)−Vthn). For example, the display scan signal Ys(N−1) can be 30V, the threshold voltage Vthn can be 0.6V, and thus the precharge voltage Vpre can be 29.4V. The first capacitor C1 can be charged by the precharge voltage Vpre and maintain the precharge voltage Vpre. The first driving transistor T1 can generate the display scan signal Ys(N) according to the clock signal CLK to drive the display pixels on the display scan line Ls(N). For example, when the clock signal CLK is 0V, the first end 1 of the first driving transistor T1 is 0V, since the control end c of the first driving transistor T1 is the precharge voltage Vpre (29.4V) and the precharge voltage Vpre is enough to fully turn on the first driving transistor T1, the second end 2 of the first driving transistor T1 is 0V, and the display scan signal Ys(N) is 0V. When the clock signal CLK is the initial driving voltage VGHini (=30V), the first end 1 of the first driving transistor T1 is 30V, since the precharge voltage Vpre (29.4V) is enough to fully turn on the first driving transistor T1, the second end 2 of the first driving transistor T1 is 30V, the precharge voltage Vpre is increased to 59.4V through the first capacitor C1, and the display scan signal Ys(N) is 30V.

In the second output unit 12*d*(1), the voltage drop unit D1 may drop the precharge voltage Vpre to generate a voltage drop Vd. In this embodiment, the voltage drop unit D1 is a diode, and can reduce the voltage drop of the forward bias threshold Vthd to the precharge voltage Vpre to generate the voltage drop Vd. For example, the precharge voltage Vpre may be 29.4V, the forward bias threshold Vthd may be 1V, and thus the voltage drop Vd may be 28.4V. In some embodiments, the voltage drop unit D1 may also include a combination of a diode, a resistor, or a voltage divider. The second capacitor C1*b* can be charged by the voltage drop Vd and maintain the voltage drop Vd. The operation of the second driving transistor T1*b* can be similar to that of the first driving transistor T1, but the voltage (Vd) of the control end of the second driving transistor T1*b* will be lower than the voltage (Vpre) of the control end c of the first driving transistor T1. If the voltage at the control end of the second driving transistor T1*b* is enough to fully turn on the second driving transistor T1*b*, since the clock signal CLK is equal to the driving voltage VGHini/VGHn, the test scan signal Yd(1) may also be equal to the driving voltage VGHini/VGHn. If the voltage at the control end of the second driving transistor T1*b* is not enough to fully turn on the second driving transistor T1*b*, the test scan signal Yd(1) may be lower than the driving voltage VGHini/VGHn. Since the transistor sizes of the first driving transistor T1 and the second driving transistor T1*b* are the same, the threshold voltages Vthn of the first driving transistor T1 and the second driving transistor T1*b* are equal. Since the voltage (Vd) of the control end of the second drive transistor T1*b* is lower than the voltage (Vpre) of the control end c of the first drive transistor T1, and the threshold voltage Vthn of the first drive transistor T1 and the second drive transistor T1*b* are equal, as the updated driving voltage VGHn gradually decreases, the second driving transistor T1*b* will be less turned on than the first driving transistor T1 before the first driving transistor T1 is fully turned on, causing the test scan signal Yd(1) to be lower than the driving voltage VGH earlier than the display scan signal Ys(N), resulting in abnormality. Therefore, if the second output voltage of the test scan signal Yd(1) is lower than the predetermined voltage Vdet, it can be considered that the driving voltage is too low.

Figure 4:
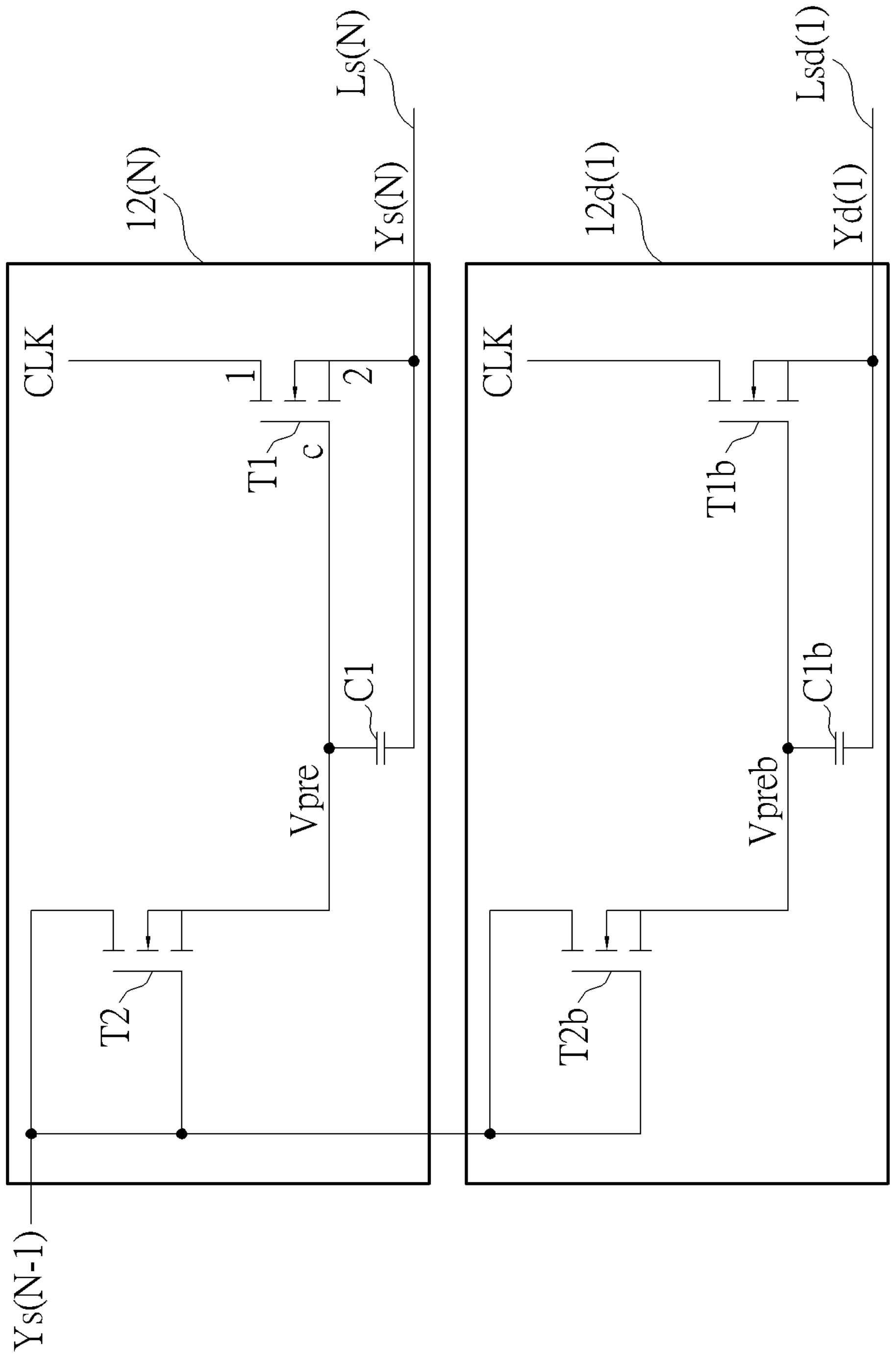
FIG. 4 is another schematic diagram of a partial circuit of the gate driving circuit of the electronic device in FIG. 1.

FIG. 4 is a diagram of another partial circuit of the gate driving circuit 12. FIG. 4 shows the first output unit 12(N) and the second output unit 12*d*(1). The circuit arrangement and operation method of the first output unit 12(N) in FIG. 3 and FIG. 4 are the same, the explanation can be referred to the previous paragraphs and will not be repeated here. The difference between the second output units 12*d*(1) in FIG. 3 and FIG. 4 is that the second output unit 12*d*(1) in FIG. 4 further includes a second precharge transistor T2*b* and does not have a voltage drop unit D1. The explanation will be given below for the second precharge transistor T2*b*.

The second precharge transistor T2*b* includes a control end, a first end coupled to the control end of the second precharge transistor T2*b* for receiving the pulse of the display scan signal Ys(N−1), and a second end for outputting the second precharge voltage Vpreb. The precharge transistor T2, the second precharge transistor T2*b*, the first drive transistor T1 and the second drive transistor T1*b* can be NMOSFETs, and the transistor size of the precharge transistor T2 and the second precharge transistor T2*b* can be the same, and the transistor sizes of the first driving transistor T1 and the second driving transistor T1*b* may be different.

The second precharge transistor T2*b* can be set in the form of a diode, and can make the display scan signal Ys(N−1) reduce the voltage drop of the threshold voltage Vthn to generate the second precharge voltage Vpreb (=Ys(N−1)−Vthn). For example, the display scan signal Ys(N−1) can be 30V, and the threshold voltage Vthn can be 0.6V, thus the second precharge voltage Vpreb can be 29.4V. Since the transistor sizes of the precharge transistor T2 and the second precharge transistor T2*b* are the same, the precharge voltages Vpre and Vpreb can be equal.

In some embodiments, the aspect ratio of the second driving transistor T1*b* is smaller than the aspect ratio of the first driving transistor T1, so the threshold voltage Vthnb of the second driving transistor T1*b* exceeds the threshold voltage Vthnb of the first driving transistor T1. For example, the threshold voltage Vthn of the first driving transistor T1 can be 0.6V, and the threshold voltage Vthnb of the second driving transistor T1*b* can be 1.6V. If the updated driving voltage VGHn gradually decreases, the second driving transistor T1*b* cannot be fully turned on before the first driving transistor T1, so that the test scan signal Yd(1) becomes abnormal earlier than the display scan signal Ys(N). Therefore, if the second output voltage of the test scan signal Yd(1) is lower than the predetermined voltage Vdet, it can be considered that the updated driving voltage VGHn is too low. The aspect ratio of the transistor may be the ratio (W/L) of the width (W) to the length (L) of the channel in the transistor.

In some embodiments, those skilled in the art can also combine the characteristics and constraints of the second output unit 12*d*(1) in FIG. 3 and FIG. 4 so the second driving transistor T1*b* has both a voltage drop unit D1 and a second driving transistor T1*b* with a aspect ratio smaller than the aspect ratio of the first driving transistor T1. For example, an aspect ratio of the second driving transistor T1*b* in FIG. 3 can also be set to be smaller than the aspect ratio of the first driving transistor T1.

For the convenience of description, FIG. 3 and FIG. 4 only show one first output unit 12(N) and one second output unit 12*d*(1), the present disclosure is not limited thereto. Those skilled in the art can set other numbers of first output units and second output units according to actual needs without violating the spirit of the present disclosure.

Figure 5:
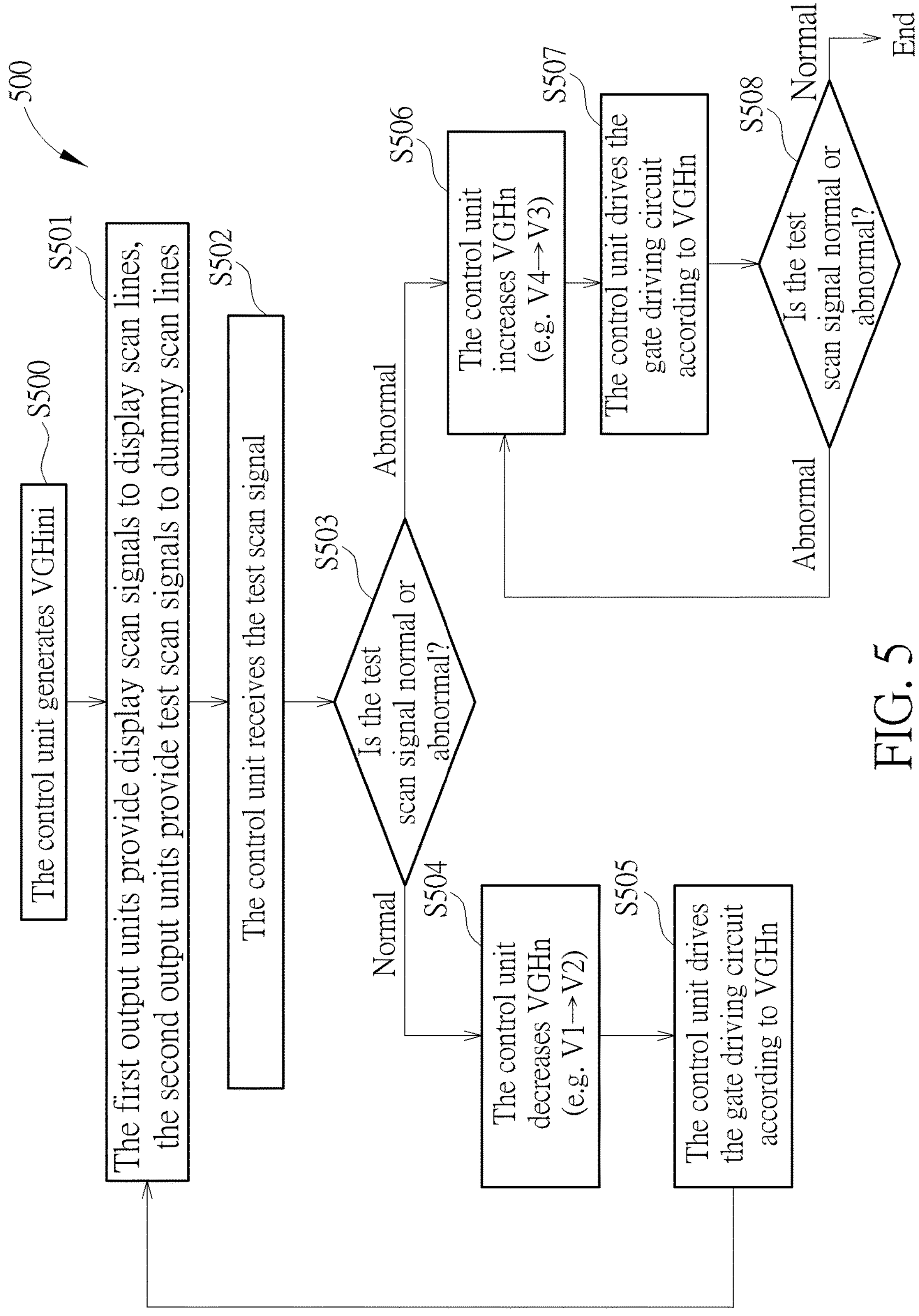
FIG. 5 is a flowchart of a driving method of the gate driving circuit of the electronic device in FIG. 1.

FIG. 5 is a flowchart of a driving method 500 of the gate driving circuit 12. According to some embodiments, the driving method is applicable when the electronic device 1 is turned on. According to some embodiments, the driving method is applicable to the display mode or the non-display mode of the electronic device 1. According to some embodiments, the driving method is applicable to the standby mode of the electronic device 1.

As shown in FIG. 5, the driving method 500 includes steps S500 to S508. As shown in FIG. 5, steps S500 to S503 are used to generate a test scan signal and determine whether the test scan signal is normal or abnormal, and steps S504 to S508 are used to update the driving voltage according to the test scan signal to generate an updated driving voltage and drive the gate driving circuit 12 according to the updated driving voltage. For example, according to some embodiments, the timing controller 100 may output an initial driving voltage VGHini with a predetermined level to the level shifter 102, for example, the initial driving voltage VGHini may be 30V. If the test scan signal is normal, the control unit 10 can decrease the driving voltage. For example, each test can be decreased by 1V. For example, the driving voltage is 30V in the first test. If the first test is normal, the driving voltage is decreased by 1V to 29V in the second test . . . until the test scan signal is abnormal. The above-mentioned voltage reduction value of 1V is only an example, and does not limit the scope of the present disclosure. According to some embodiments, if the test scan signal is abnormal, the control unit can increase the driving voltage. For example, if the test scan signal is abnormal, the driving voltage can be increased by 1V. When the driving voltage is 25V and the test scan signal is abnormal, the control unit can increase the driving voltage to 26V.

Any reasonable change, sequence or adjustment of steps is within the scope of the present disclosure. Steps S500 to S508 are explained as follows:

Step S500: The control unit 10 generates an initial driving voltage VGHini;

Step S501: the first output units 12(1) to 12(N) provide display scan signals Ys(1) to Ys(N) to display scan lines Ls(1) to Ls(N) respectively, and the second output units Yd(1) and Yd(2) provide test scan signals Yd(1) and Yd(2) to dummy scan lines Yd(1) and Yd(2) respectively;

Step S502: the control unit 10 receives the test scan signal Yd;

Step S503: the control unit 10 determines whether the test scan signal Yd is normal or abnormal; if normal, proceed to step S504; if abnormal, proceed to step S506;

Step S504: the control unit 10 decreases the driving voltage VGHn to generate an updated driving voltage VGHn;

Step S505: the control unit 10 drives the gate driving circuit 12 according to the updated drive voltage VGHn; continue to step S501;

Step S506: the control unit 10 increases the driving voltage VGHn to generate an updated driving voltage VGHn;

Step S507: the control unit 10 drives the gate driving circuit 12 according to the updated drive voltage VGHn;

Step S508: the control unit 10 determines whether the test scan signal Yd is normal or abnormal; if normal, end the driving method 500; if abnormal, continue to step S506.

As in the driving method 500 mentioned above, the updated gate driving voltage can be generated according to the test scan signal. When the test scan signal is normal, the control unit can decrease the driving voltage to generate an updated driving voltage. When the test scan signal is abnormal, the control unit can increase the driving voltage to generate an updated driving voltage. The updated driving voltage can be the gate driving voltage for normal operation of the electronic device to drive the gate driving circuit. The updated driving voltage can be the minimum driving voltage for the normal operation of the electronic device, to optimize the driving voltage, reduce waste of power consumption and prolong the service life.

FIG. 6 is a diagram of the driving method 500, where the horizontal axis represents time t and the vertical axis represents voltage V. FIG. 6 shows the updated driving voltage VGHn, the display scan signal Ys and the test scan signal Yd. The display scan signal Ys may include display scan signals Ys(1) to Ys(N) of a plurality of image frames, and the test scan signal Yd may include test scan signals Yd(1) and Yd(2) of a plurality of image frames. For example, when performing a test, if the test scan signal Yd passes the test, the control unit 10 may gradually decrease the updated driving voltage VGHn from the initial drive voltage VGHini until the test scan signal Yd fails the test. In FIG. 6, passing the test may indicate that both the test scan signals Yd(1) and Yd(2) are normal, and failing the test may indicate that the test scan signals Yd(1) or Yd(2) are abnormal. Steps S500 to S508 of the driving method 500 are explained below with FIG. 6.

Before time t1, the control unit 10 generates an initial driving voltage VGHini (for example, V1(VGHini)=30V) (step S500), generates a starting signal STV and a clock signal CLK according to the voltage V1, and outputs the starting signal STV and the clock signal CLK to the gate driving circuit 12 so that the first output units 12(1) to 12(N) respectively provide display scan signals Ys(1) to Ys(N) to the display scan lines Ls(1) to Ls(N), and make the second output units Yd(1) and Yd(2) respectively provide test scan signals Yd(1) and Yd(2) to the dummy scan lines Yd(1) and Yd(2) (step S501). Then, the control unit 10 receives the test scan signal Yd (step S502) and determines whether the test scan signal Yd is normal or abnormal (step S503). The test scan signal Yd is normal as shown in FIG. 2A, and the test scan signal Yd is abnormal as shown in FIGS. 2B and 2C. Since the test scan signal Yd before time t1 is normal, at time t2, the control unit 10 decreases the initial driving voltage VGHini from voltage V1 to voltage V2 to generate an updated driving voltage VGHn (step S504), and generates a start signal STV and a clock signal CLK according to the updated driving voltage VGHn, in order to drive the gate driving circuit 12 (step S505).

Between time t2 and time t3, the first output units 12(1) to 12(N) provide display scan signals Ys(1) to Ys(N) to display scan lines Ls(1) to Ls(N) respectively, and the second output unit Yd(1) and Yd(2) provide test scan signals Yd(1) and Yd(2) to dummy scan lines Yd(1) and Yd(2) respectively (step S501), the control unit 10 receives the test scan signal Yd (step S502) and determines whether the test scan signal Yd is normal or abnormal (step S503). Since the test scan signal Yd is normal between time t2 and time t3, at time t3, the control unit 10 decreases the updated driving voltage VGHn from voltage V3 to voltage V4 (step S504), and generates a start signal STV and a clock signal CLK according to the updated driving voltage VGHn, in order to drive the gate driving circuit 12 (step S505).

Between time t1 and time t2, the first output units 12(1) to 12(N) provide display scan signals Ys(1) to Ys(N) to display scan lines Ls(1) to Ls(N) respectively, and the second output units Yd(1) and Yd(2) provide test scan signals Yd(1) and Yd(2) to dummy scan lines Yd(1) and Yd(2) respectively (step S501), the control unit 10 receives the test scan signal Yd (step S502) and determines whether the test scan signal Yd is normal or abnormal (step S503). Since the test scan signal Yd is normal between time t1 and time t2, at time t2, the control unit 10 decreases the updated driving voltage VGHn from voltage V2 to voltage V3 (step S504), and generates a start signal STV and a clock signal CLK according to the updated driving voltage VGHn, in order to drive the gate driving circuit 12 (step S505).

Between time t2 and time t3, the first output units 12(1) to 12(N) provide display scan signals Ys(1) to Ys(N) to display scan lines Ls(1) to Ls(N) respectively, and the second output units Yd(1) and Yd(2) provide test scan signals Yd(1) and Yd(2) to dummy scan lines Yd(1) and Yd(2) respectively (step S501), the control unit 10 receives the test scan signal Yd (step S502) and determines whether the test scan signal Yd is normal or abnormal (step S503). Since the test scan signal Yd is normal between time t2 and time t3, at time t3, the control unit 10 decreases the updated driving voltage VGHn from voltage V3 to voltage V4 (step S504), and generates a start signal STV and a clock signal CLK according to the updated driving voltage VGHn, in order to drive the gate driving circuit 12 (step S505).

Between time t3 and time t4, the first output units 12(1) to 12(N) provide display scan signals Ys(1) to Ys(N) to display scan lines Ls(1) to Ls(N) respectively, and the second output units Yd(1) and Yd(2) provide test scan signals Yd(1) and Yd(2) to dummy scan lines Yd(1) and Yd(2) respectively (step S501), the control unit 10 receives the test scan signal Yd (step S502) and determines whether the test scan signal Yd is normal or abnormal (step S503). Since the test scan signal Yd is abnormal between time t3 and time t4, at time t4, the control unit 10 increases the updated driving voltage VGHn from voltage V4 to voltage V3 (step S506), and generates a start signal STV and a clock signal CLK according to the updated driving voltage VGHn, in order to drive the gate driving circuit 12 (step S507).

Between time t4 and the time t5, the control unit 10 continues to receive the test scan signal Yd and determines whether the test scan signal Yd is normal or abnormal (step S508). Since the test scan signal Yd is normal between time t4 and time t5, the updated driving voltage VGHn is maintained at voltage V3, and the driving method 500 can end.

The display scan signal Ys between time t1 and time t5 is normal. The period between time t1 and time t2, between time t2 and time t3, between time t3 and time t4, and between time t4 and time t5 can be equal to period Td, and period Td can be the time required for scanning a plurality of image frames or a predetermined length of time, such as 1 minute. According to some embodiments, the control unit 10 may receive the test scan signal at a fixed time interval (for example Td). The time of Td is not limited, and 1 minute is taken as an example here.

Figure 7:
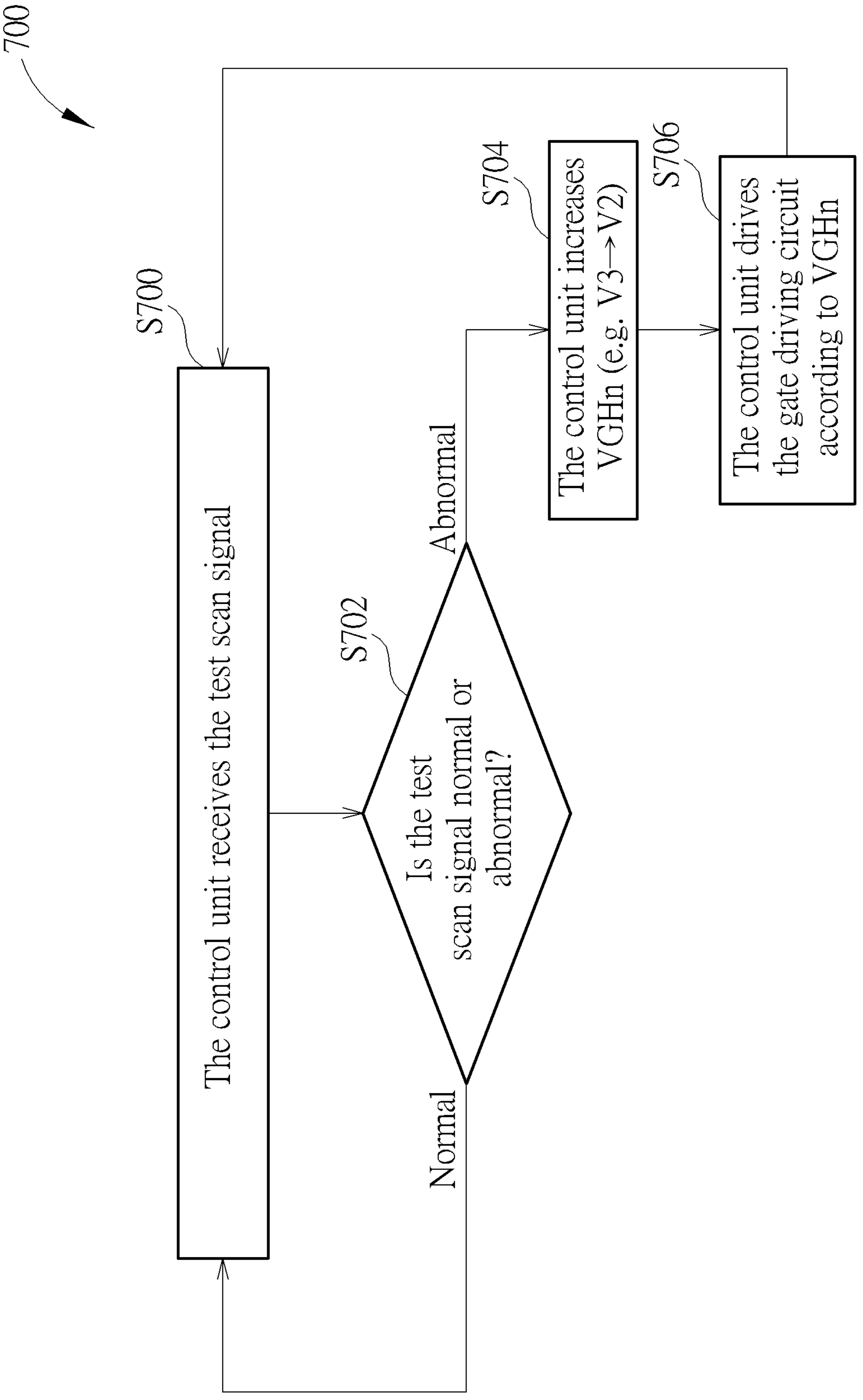
FIG. 7 is a flowchart of another driving method of the gate driving circuit of the electronic device in FIG. 1.

FIG. 7 is a flowchart of another driving method 700 for the gate driving circuit 12, which is applicable to the standby mode when the electronic device 1 is in standby. The driving method 700 includes steps S700 to S706, wherein steps S700 and S702 are used to determine whether the test scan signal is normal or abnormal; if normal, return to step S700 to continue receiving the test scan signal; if abnormal, perform steps S704 and S706 to increase the updated driving voltage VGHn. Any reasonable change, sequence or adjustment of steps is within the scope of the present disclosure. Steps S700 to S706 are explained as follows:

Step S700: The control unit 10 receives the test scan signal Yd in the standby mode;

Step S702: The control unit 10 determines whether the test scan signal Yd is normal or abnormal; if normal, proceed to step S700; if abnormal, proceed to step S704;

Step S704: The control unit 10 increases the driving voltage VGHn to generate an updated driving voltage VGHn;

Step S706: The control unit 10 drives the gate driving circuit 12 according to the updated driving voltage VGHn; continue to step S700.

Figure 8:
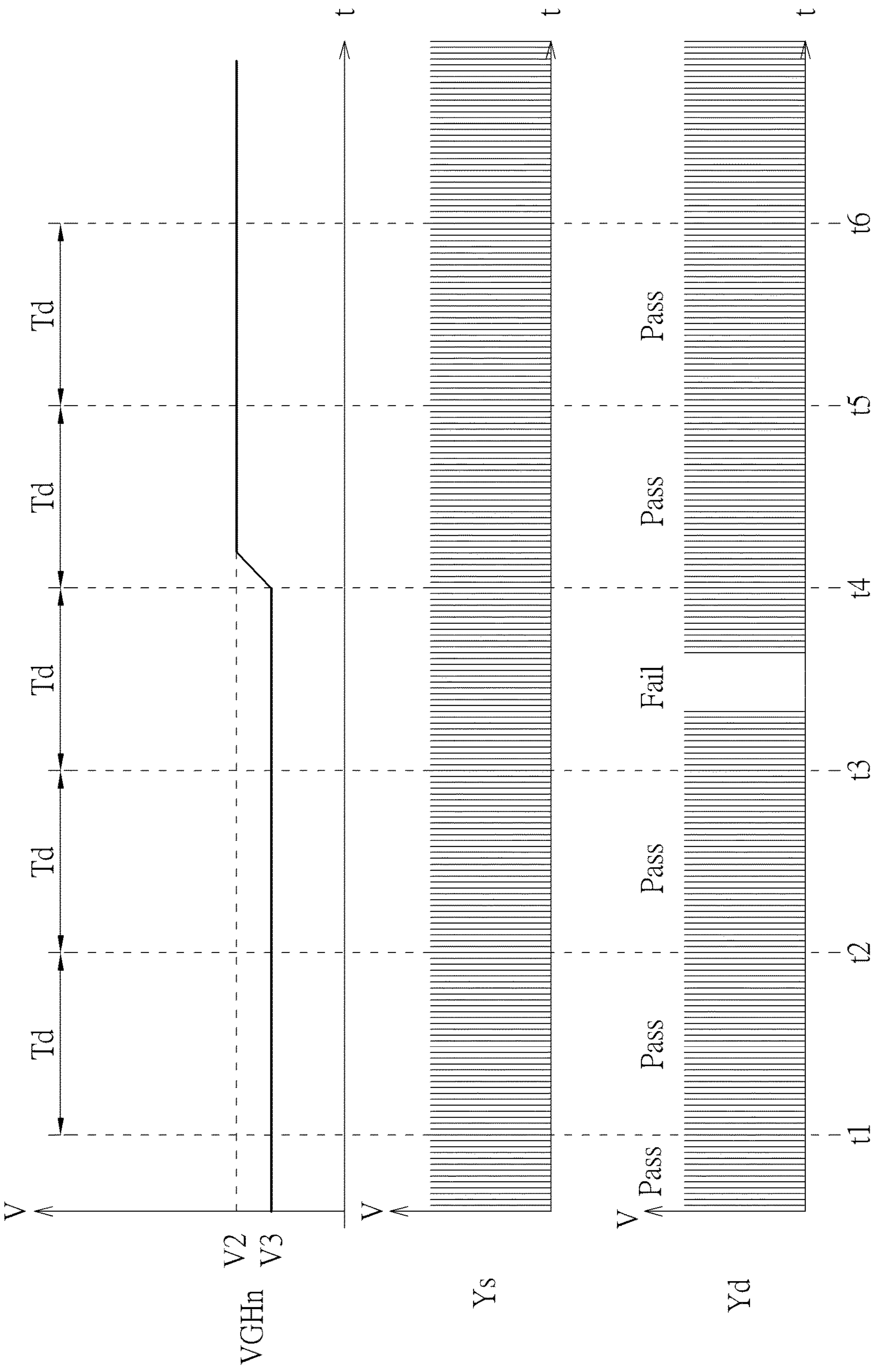
FIG. 8 is a diagram of the driving method in FIG. 7.

The driving method 700 optimizes the updated driving voltage VGHn according to the test scan signal. FIG. 8 is a diagram of a driving method 700, where the horizontal axis represents time t and the vertical axis represents voltage V. FIG. 8 shows the updated driving voltage VGHn, the display scan signal Ys and the test scan signal Yd. The display scan signal Ys may represent display scan signals Ys(1) to Ys(N) of a plurality of image frames, and the test scan signal Yd may represent test scan signals Yd(1) and Yd(2) of a plurality of image frames. In the standby mode, the control unit 10 periodically detects abnormal test scan signal Yd, if abnormal test scan signal Yd is detected, increases the driving voltage until the test scan signal Yd returns to normal. Steps S700 to S706 of the driving method 700 are explained below with FIG. 8.

Between time t1 and time t2, the control unit 10 receives the test scan signal Yd (step S700) and determines whether the test scan signal Yd is normal or abnormal (step S702). Since the test scan signal Yd is normal between time t1 and time t2, the control unit 10 maintains the updated driving voltage VGHn at the voltage V3 at time t2. Between time t2 and time t3, the control unit 10 receives the test scan signal Yd (step S700) and determines whether the test scan signal Yd is normal or abnormal (step S702). Since the test scan signal Yd is normal between time t2 and time t3, the control unit 10 still maintains the updated driving voltage VGHn at the voltage V3 at time t3.

Between time t3 and time t4, the control unit 10 receives the test scan signal Yd (step S700) and determines whether the test scan signal Yd is normal or abnormal (step S702). Since the test scan signal Yd is abnormal between time t3 and time t4, at time t4, the control unit 10 increases the updated driving voltage VGHn from voltage V3 to voltage V2 (step S704), and generates a start signal STV and a clock signal CLK according to the updated driving voltage VGHn, in order to drive the gate driving circuit 12 (step S706).

Between time t4 and time t5, the control unit 10 continues to receive the test scan signal Yd (step S700) and determines whether the test scan signal Yd is normal or abnormal (step S702). Since the test scan signal Yd is normal between time t4 and time t5, the control unit 10 maintains the updated driving voltage VGHn at the voltage V2. Between time t5 and time t6, the control unit 10 continues to receive the test scan signal Yd (step S700) and determines whether the test scan signal Yd is normal or abnormal (step S702). Since the test scan signal Yd is normal between time t5 and the time t6, the control unit 10 continues to maintain the updated driving voltage VGHn at the voltage V2.

The display scan signal Ys between time t1 and time t6 is normal. The periods between time t1 and time t2, between time t2 and time t3, between time t3 and time t4, between time t4 and time t5, and between time t5 and time t6 may be equal to period Td, the period Td may be the time needed for scanning a plurality of image frames or may be a predetermined length of time, such as 1 minute.

The embodiment of the present disclosure provides an electronic device and its driving method. The display panel is formed with a dummy scan line. The second output units of the gate driving circuit provide test scan signals to the dummy scan lines. The control unit receives the test scan signal, updates the driving voltage according to the test scan signal, and drives the gate driving circuit according to the updated driving voltage. According to some embodiments, the updated driving voltage may be the lowest driving voltage for the normal operation of the electronic device, so as to optimize the driving voltage, reduce power consumption and prolong the service life.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device comprising:

a display panel comprising a display scan line and a dummy scan line;

a gate driving circuit comprising:

a first output unit for providing a display scan signal to the display scan line; and a second output unit for providing a test scan signal to the dummy scan line; and a control unit electrically connected to the gate driving circuit for receiving the test scan signal, updating a driving voltage according to the test scan signal, and driving the gate driving circuit according to the updated driving voltage.

2. The electronic device of claim 1, wherein the control unit receives the test scan signal periodically.

3. The electronic device of claim 1, wherein:

if an output voltage of the test scan signal is lower than a predetermined voltage, the control unit increases the driving voltage to generate the updated driving voltage.

4. The electronic device of claim 1, wherein:

if an output voltage of the test scan signal is higher than a predetermined voltage, the control unit decreases the driving voltage to generate the updated driving voltage.

5. The electronic device of claim 1, wherein:

the first output unit comprises:

a precharge transistor for receiving a pulse to generate a precharge voltage; and the second output unit comprises:

a voltage drop unit coupled to the precharge transistor for stepping down the precharge voltage to generate a reduced voltage.

6. The electronic device of claim 5, wherein:

the first output unit further comprises:

a first capacitor coupled to the first precharge transistor for being charged by the first precharge voltage; and a first driving transistor comprising:

a control end coupled to the first capacitor; and a first end for receiving a clock signal, the clock signal being generated according to the updated driving voltage; and the second output unit further comprises:

a second capacitor coupled to the second precharge transistor for being charged by the reduced voltage; and a second driving transistor comprising:

a control end coupled to the second capacitor;

a first end for receiving the clock signal; and a second end for outputting the test scan signal.

7. The electronic device of claim 6, wherein:

a transistor size of the first driving transistor is equal to a transistor size of the second driving transistor.

8. The electronic device of claim 6, wherein:

an aspect ratio of the second driving transistor is smaller than an aspect ratio of the first driving transistor.

9. The electronic device of claim 1, wherein:

the first output unit comprises:

a first precharge transistor for receiving a pulse to generate a first precharge voltage;

a first capacitor coupled to the first precharge transistor for being charged by the first precharge voltage; and a first driving transistor comprising:

a control end coupled to the first capacitor;

a first end for receiving a clock signal, the clock signal being generated according to the updated driving voltage; and a second end for outputting the display scan signal; and the second output unit comprises:

a second precharge transistor for receiving a pulse to generate a second precharge voltage;

a second capacitor coupled to the second precharge transistor for being charged by the second precharge voltage; and a second driving transistor comprising:

a control end coupled to the second capacitor;

a first end for receiving the clock signal; and a second end for outputting the test scan signal;

wherein an aspect ratio of the second driving transistor is smaller than an aspect ratio of the first driving transistor.

10. The electronic device of claim 1, wherein:

the display panel has a display area and an adjacent surrounding area, and the display scan line is formed in the display area, and the dummy scan line is formed in the surrounding area.

11. The electronic device of claim 1, wherein:

the gate driving circuit is integrated on a substrate of the display panel.

12. The electronic device of claim 1, wherein:

the control unit comprises:

a timing controller; and a level shifter coupled to the timing controller.

13. The electronic device of claim 12, wherein:

the timing controller outputs an initial driving voltage having a predetermined level to the level shifter; and the level shifter adjusts the initial driving voltage to generate the updated driving voltage, and outputs a start signal and a clock signal to the gate driving circuit according to the updated driving voltage.

14. A method for driving an electronic device, the electronic device comprising a display panel, a gate driving circuit and a control unit, the display panel comprising a display scan line and a dummy scan line, the gate driving circuit comprising a first output unit and a second output unit, the control unit being electrically connected to the gate driving circuit, the method comprising:

the first output unit providing a display scan signal to the display scan line, the second output unit providing a test scan signal to the dummy scan line;

the control unit receiving the test scan signal;

the control unit updating a driving voltage according to the test scan signal to generate an updated driving voltage; and the control unit driving the gate driving circuit according to the updated driving voltage.

15. The method of claim 14, wherein the control unit updating the driving voltage according to the test scan signal to generate the updated driving voltage comprises:

if the control unit receives the test scan signal at a non-predetermined time, the control unit determines that the test scan signal is abnormal.

16. The method of claim 14, wherein the control unit updating the driving voltage according to the test scan signal to generate the updated driving voltage comprises:

if the second output voltage of the test scan signal is lower than the predetermined voltage, the control unit determines that the test scan signal is abnormal.

17. The method of claim 14, wherein the control unit updating the driving voltage according to the test scan signal to generate the updated driving voltage comprises:

if the control unit receives the test scan signal at a predetermined time and the second output voltage of the test scan signal is greater than the predetermined voltage, the control unit determines that the test scan signal is normal.

18. The method of claim 14, wherein the control unit updating the driving voltage according to the test scan signal to generate the updated driving voltage comprises:

if the test scan signal is normal, the control unit decreasing the driving voltage to generate the updated driving voltage.

19. The method of claim 14, wherein the control unit updating the driving voltage according to the test scan signal to generate the updated driving voltage comprises:

if the test scan signal is abnormal, the control unit increasing the driving voltage to generate the updated driving voltage.

20. The method of claim 14, further comprising:

the control unit storing a predetermined voltage;

wherein the control unit updating the driving voltage according to the test scan signal to generate the updated driving voltage comprises:

if an output voltage of the test scan signal is lower than the predetermined voltage, the control unit increasing the driving voltage to generate the updated driving voltage; and if the output voltage of the test scan signal is higher than the predetermined voltage, the control unit decreasing the driving voltage to generate the updated driving voltage.

* * * * *